United States Patent [19]
Suzuki

[11] Patent Number: 5,896,496
[45] Date of Patent: Apr. 20, 1999

[54] PERMANENT CONNECTION MANAGEMENT METHOD IN EXCHANGE NETWORK

[75] Inventor: Yuko Suzuki, Kawasaki, Japan

[73] Assignee: Fujitsu Limited, Kanagawa, Japan

[21] Appl. No.: 08/872,344

[22] Filed: Jun. 10, 1997

Related U.S. Application Data

[63] Continuation of application No. 08/430,180, Apr. 27, 1995, abandoned.

[30] Foreign Application Priority Data

Apr. 28, 1994 [JP] Japan .................... 6-092739

[51] Int. Cl.$^6$ ................ G06F 13/00; H04G 15/00
[52] U.S. Cl. ................ 395/185.01; 395/184.01; 395/183.19; 370/248
[58] Field of Search ............ 395/185.01, 185.02, 395/185.09, 183.19, 184.01; 370/248, 241, 242

[56] References Cited

U.S. PATENT DOCUMENTS

| | | | |
|---|---|---|---|
| 4,507,777 | 3/1985 | Tucker et al. | 370/16 |
| 4,527,270 | 7/1985 | Sweeton | 371/11 |
| 4,627,055 | 12/1986 | Mori et al. | 371/16 |
| 5,239,537 | 8/1993 | Sakauchi | 370/16 |
| 5,390,326 | 2/1995 | Shah | 395/575 |
| 5,416,777 | 5/1995 | Kirkham | 370/85.8 |
| 5,461,608 | 10/1995 | Yoshiyama | 370/16.1 |

OTHER PUBLICATIONS

Ryutaro Kawamura et al., Self–Healing ATM Networks Based on Virtual Path Concept, Jan. 1, 1994, IEEE, pp. 120–127.

Wei–Kuo Chiang, Distributed Fault–Tolerant Routing in Kantz Networks, 1992, IEEE, pp. 297–303.

Noriaki Yoshikai et al., Message Control Channel Protocol and Performance Analysis for Distributed ATM Virtual Path, 1993, IEEE pp. 1589–1595.

Kanayama, Yukiharu, Virtual Path Management Functions for Broad Band ATM Networks, 1991, Globecom, pp. 1401–1405.

Farkouh, Stephen C, Managing ATM–based BroadBand Networks, 1993 IEEE, pp. 82–86.

*Primary Examiner*—Robert W. Beausoliel, Jr.
*Assistant Examiner*—Norman Michael Wright
*Attorney, Agent, or Firm*—Helfgott & Karas, P.C.

[57] ABSTRACT

A polling is executed periodically among each of nodes connected by a transmission path mutually. The node recognizes that a defect occurred in a connection state of the transmission path, when it detects a lack of a periodic polling from an adjacent node three times. Then, the node registers that all of permanent connections which are set up so as to pass through the transmission path are invalid in its Permanent Virtual Circuit (PVC) management table, and notifies the invalidity of the permanent connection to the node of the next step in the permanent connection. The node of the next step which received the notification registers that the notified permanent connection is invalid in its PVC table and notifies the invalidity of the notified permanent connection to the node of the further next step.

10 Claims, 9 Drawing Sheets

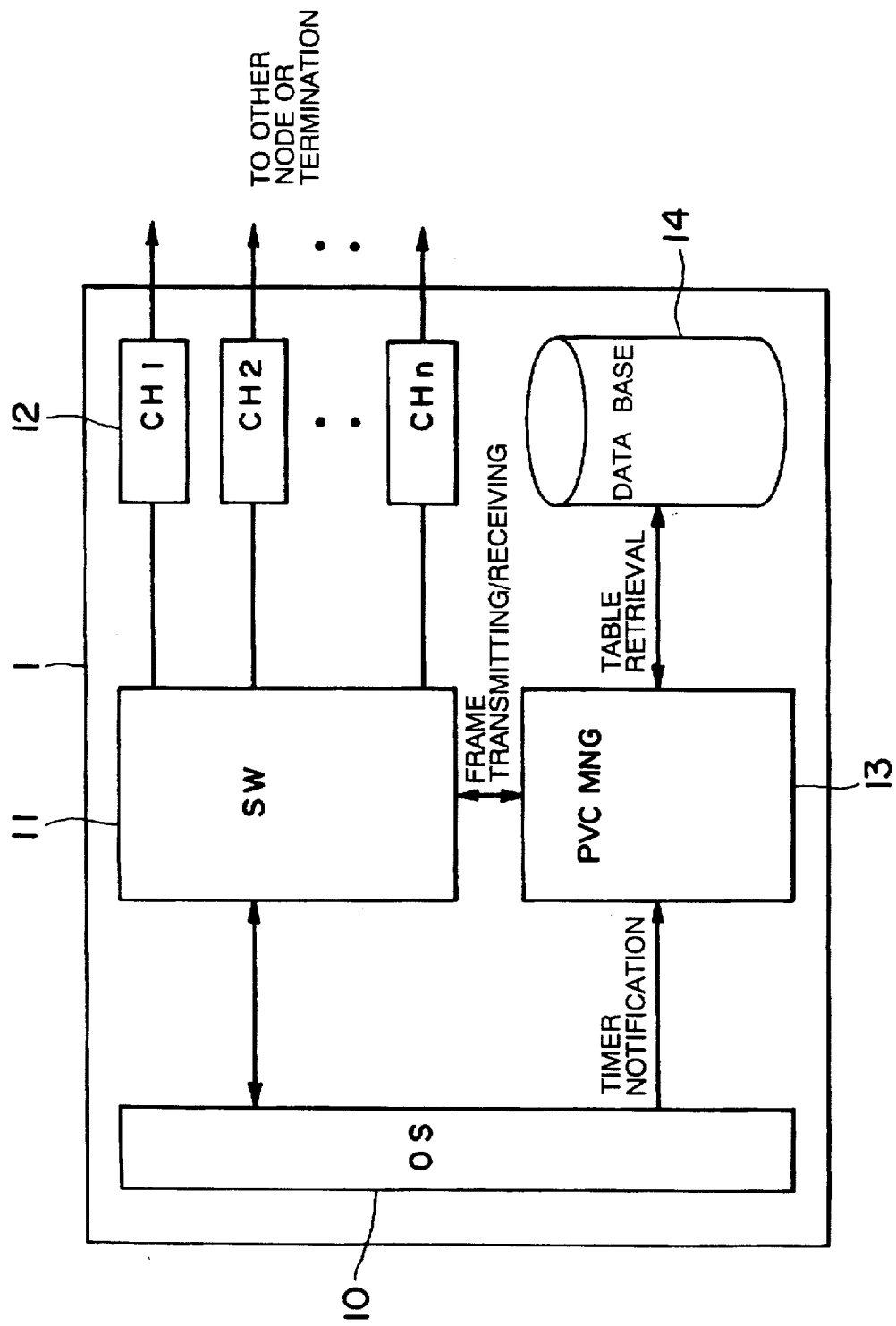

FIG. 5

| PVCID | PVC STATE |
|---|---|
| 1 | Active |
| 2 | Inactive |
| : | : |
| 31 | Active |
| 32 | Active |
| : | : |
|  |  |

| ROUTING TABLE FOR PORT 1 | | | |
|---|---|---|---|
| IN DLCI | OUT PORT | OUT DLCI | PVCID |
| 1 | 4 | 3 | 2 |
| : | | | |
| 16 | 5 | 17 | 32 |
|  |  |  |  |

| ROUTING TABLE FOR PORT 5 | | | |
|---|---|---|---|
| IN DLCI | OUT PORT | OUT DLCI | PVCID |
| 1 | 2 | 14 | 7 |
| : | | | |
| 17 | 1 | 16 | 31 |
| : | | | |

~14b

→ : PVC STATE NOTIFICATION (PERIODIC POLLING)
--→ : PERIODIC POLLING

PERMANENT CONNECTION MANAGEMENT METHOD IN EXCHANGE NETWORK This is a continuation, of application Ser. No. 08/430, 180, filed Apr. 27, 1995, now abandoned.

BACKGROUND OF THE INVENTION

1. Field of the Invention

The present invention relates to a management system for maintaining and managing a permanent connection in an exchange network which is composed of a plurality of nodes connected mutually through a transmission path.

2. Description of the Prior Art

For instance, in a exchange network like a frame relay, a service of PVC (Permanent Virtual Circuit) in which a virtual path is set up by registering parties of communication in the exchange network previously so that transmission path can be used as though it were a common carrier leased line has been executed. The exchange network has assigned all of the nodes through which the virtual path by one PVC passes, and has made the assigned nodes register a discrimination information of the PVC and a discrimination information of input/output channels in the node for the PVC, so as to put the PVC service into operation. The discrimination information thus registered, so that a frame transmitted from the transmission terminal will be transferred to each node in which the PVC is set up one after another and will be transmitted to the other party of the communication without installing a center which controls each node intensively within the exchange network.

By the way, if a trouble occurs in one of the nodes in which one PVC is set up or in a transmission path, frames transmitted by the PVC will be abandoned at the trouble portion. Therefore, the communication through this will be inexecutable. However, other node in which the PVC is set up and terminals which transmit frames through the PVC are not capable of recognizing the trouble occurrence. Accordingly, the nodes and the transmission terminal will continue transmitting or transferring frames as before even after the trouble occurs. The fact will cause a loss of communication contents, and will cause a waste of exchange network resources.

For this reason, in a traditional exchange network, a management by SNMP (Simple Network Monitoring Protocol) has been executed. In the SNMP, a monitoring node which monitors a PVC state in all nodes composing the network is provided, and PVC state monitoring informations from each node are accumulated into the monitoring node. The monitoring node executes an intensive monitoring of the PVC state within the network with the accumulated PVC state monitoring information, and executes such controls as making the PVC invalid as occasion demands. An outline of the intensive monitoring in the traditional exchange network will be described on the basis of FIG. 14.

In FIG. 14, each node 21 detects whether or not a link (a transmission path, an interface) L between the node 21 and the adjacent nodes 21 is down by mechanical means, and holds the detected information (a state notifying information). Hereupon, the down of the link means that the transferring of the frame becomes inexecutable due to the disconnection of the transmission path, the trouble of the adjacent node 21 and so on. The monitoring node 20 executes a polling for all of the nodes 21-1–21-6, periodically or according to circumstances, to command them to transmit the state notifying information. Then, the monitoring node 20 receives the state notifying information that each node 21 transmitted corresponding to the command, and recognizes the down of the link by analyzing each of the received information. Besides, the monitoring node 20 distributes the information concerning the link down to all of the nodes 21, and directs the nodes 21 to do such processes as invalidating the PVC whose frame transmission would become impossible by the down of the link 21.

However, the monitoring node 20 is not connected to each of the nodes 21 directly. For this reason, the information exchanged between the monitoring node 20 and the distant nodes (21-2–21-6 in FIG. 14) which are not connected directly to the monitoring node 20 is relayed by the nodes that were existing between them. For instance, the information exchanged between the node 20 and node 21-1 is relayed by the node 21-1 and passed through the transmission path L1 and L2. Besides, the information exchanged between the node 20 and the node 21-3 is relayed by the node 21-1 and passed through the transmission paths L1, L2 and L7. Accordingly, the capacity of the transmission paths has been occupied to a large extent, since the information concerning the plurality of nodes were transmitted simultaneously in the transmission paths L1 and L2. As mentioned hereinbefore, the transmission path has not been used effectively in the traditional intensive monitoring system.

Besides, in the traditional intensive monitoring system, the monitoring node 20 does not recognize the information concerning the PVC which is set up in each of the nodes 21. Thus, the monitoring node 20 could not assign the nodes to be distributed, so that it had to distribute the down information to all of the nodes, even though the information is needed only by the nodes in which the PVC passing through the downed link is set up. Accordingly, the transmission path has been given further excessive load, since the down information was also distributed to the nodes which did not need the information.

SUMMARY OF THE INVENTION

The present invention was achieved considering the above-mentioned points, and an object of the present invention is to provide a permanent connection management system which does not need a special monitoring node, and is capable of transmitting an information about a defect of connection state of PVC to all of the nodes associating with the PVC without giving an excessive load to a transmission path.

The permanent connection management method of the present invention is executed in an exchange network which is composed of a plurality of nodes connected mutually by a transmission path. In the network, adjacent both nodes connected mutually by the transmission path monitor the connection state therebetween. When a defect of a connection state between them is detected, each of the nodes registers that the permanent connection which is set up so as to pass through the transmission path between them is invalid, and notifies the invalidity of the concerned permanent connection to the node of the next step in the permanent connection. The node which was notified of the invalidity of the permanent communication registers that the notified permanent connection is invalid, and notifies the invalidity of the concerned permanent connection to the node of the next step in the permanent connection.

Besides, the node of the present invention is a node which composes an exchange network when it is connected to other node by a transmission. The node comprises a data registration unit for registering a connection state for every permanent connection which is set up between itself and the adjacent node, a trouble monitoring unit for detecting a defect of the transmission path between itself and the adjacent node, a data renewal unit for making the data registration unit register that the permanent connection which is set up so as to pass through the transmission path is invalid, when the defect of the transmission path is detected by the trouble monitoring unit, and notification means for notifying that the permanent connection which is set up so as to pass through the transmission path is invalid to the node of the next step in the permanent connection, when the defect of the transmission path is detected by the trouble monitoring unit.

BRIEF DESCRIPTIONS OF THE DRAWINGS

The present invention will become more fully understood from the detailed description given hereinbelow and the accompanying drawings which are given by way of illustration only, and thus are not limitative of the present invention, and wherein:

FIG. 3 is a block diagram indicating a construction of each node according to the second embodiment of the present invention.

FIG. 5 is a diagram indicating a PVC state management table stored in a database in FIG. 3.

FIG. 6 is a diagram indicating a routing table for a first port stored in a database in FIG. 3.

FIG. 7 is a diagram indicating a routing table for a fifth port stored in a database in FIG. 3.

DESCRIPTION OF THE PREFERRED EMBODIMENTS

Figure 1:
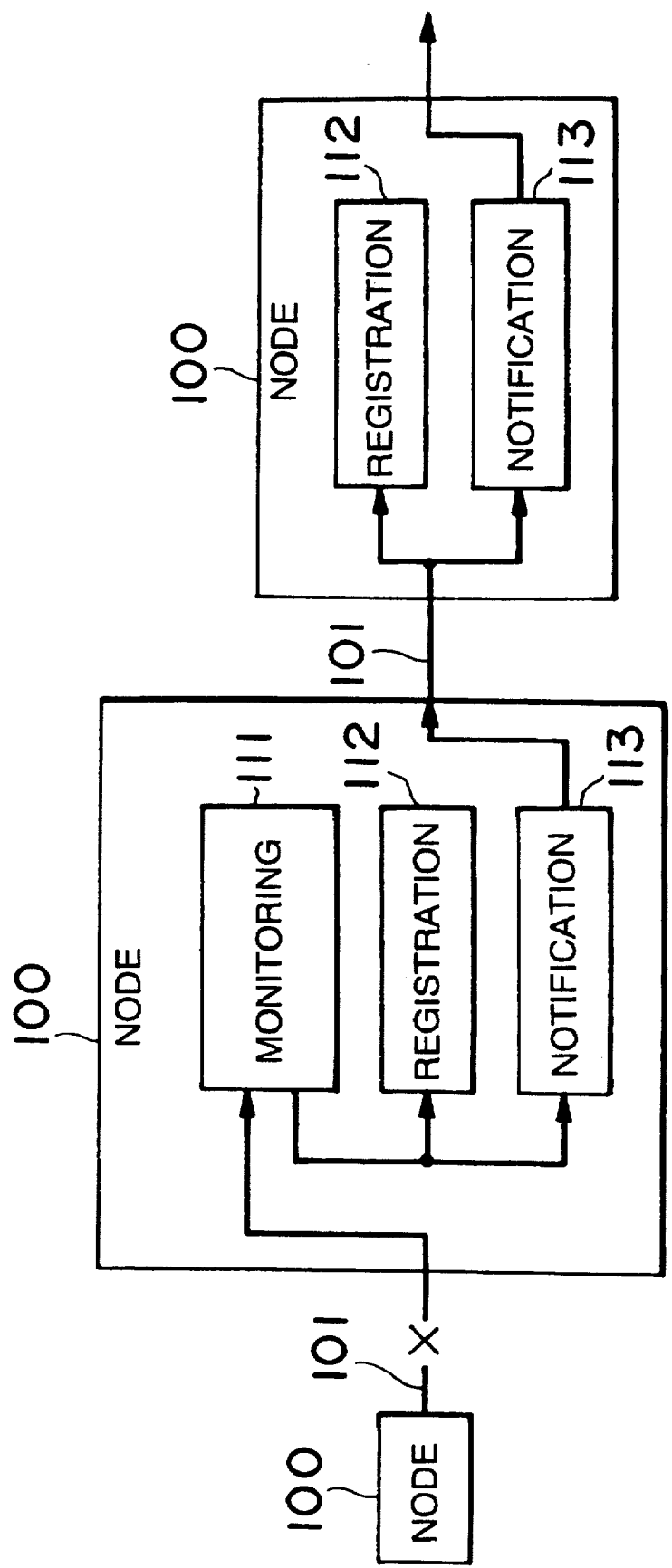
FIG. 1 is a principle diagram of the first embodiment of the present invention.

Then, the embodiments of the present invention will be described by referring to the drawings. Besides, in the following each embodiment, the present invention is applied to a frame relay exchange network as an example.

First Embodiment

FIG. 1 is a schematic construction diagram of a frame relay exchange network to which a permanent connection management system is applied according to the first embodiment of the present invention.

The frame relay exchange network is composed of a plurality of nodes 100 connected mutually by a transmission path 101. A monitoring unit 111 of the adjacent both nodes 100 monitors a connection state between the adjacent nodes connected by each transmission path 101. A registration unit 112 of each node 100 registers that the permanent connection which passes through the transmission path 100 is invalid, when a defect of a connection state between the node in which the registration unit 112 is incorporated and the adjacent other node is detected by the monitoring unit 111. A notification unit 113 of each node 100 notifies the invalidity of the permanent connection to the node of the next step in the permanent connection, when the invalidity of the permanent connection is registered by the registration unit 112.

Besides, the registration unit 112 of each node 100 registers that the notified permanent connection is invalid, when it receives the notification from the adjacent other node 100. Then, the notification unit 113 of the node 100 notifies the invalidity of the concerned permanent connection to the node 100 of further next step in the permanent connection.

Each constructive unit of the first embodiment will be described in detail as follows.

A frame relay exchanger and a packet exchanger can be substituted for the node 100 of the first embodiment. Besides, a node dedicated to relay and a node to which a terminal is connected can be substituted for each node 100.

A mechanical sensor and a sensor which detects a connection state electrically by hardware can be substituted for the monitoring unit 111 which monitors the connection state between the node incorporating the unit 111 and the adjacent node 100 in the first embodiment.

Further, the monitoring unit 111 also can detect the connection state logically by software. In the logic of the detection, the periodic polling is mutually executed between the adjacent both nodes 100, and the defect of the connection state between the both nodes 100 is recognized, when one node 100 detects the lack of the polling from the opposite node 100 is detected. By these actions, the load against CPU of the node 100 can be reduced, since only sequence for detection has to be executed intermittently. Besides, a response of the recognition for defect occurrence can be easily changed by changing a cycle of the polling. Further, in this case, the defect occurrence can be recognized as soon as the lack of the polling from the counterpart was detected once. However, it is desirable to recognize the defect occurrence when the lack of polling was detected plural times, in order to avoid a misoperation due to a misrecognition. The number of times the polling was detected in that case may be, for instance, three times. By these actions, the response of the recognition for the defect occurrence can be compatible with a certainty of the defect recognition.

Besides, "the defect of the connection state" includes a case that a logical defect occurred in the interface between the transmission path 101 and each node 100, in addition to a physical demolition of the transmission path 101 itself.

Further, each transmission path 101 is provided independently in every direction so that the frame can be transferred to the both directions. Accordingly, there are some cases that the defect occurs only in a connection in one direction. For instance, it is a case that a defect occurs in a communication of down direction while the defect does not occur in the communication of up direction. Therefore, each node 100 manages the all permanent connection whose virtual path is set up passing through the node 100 itself in every direction of the communication. Besides, when detecting a defect of the connection state, each node 100 registers the invalidity of the permanent connection which is set through the transmission path of the direction in which the defect occurred, and notifies the invalidity of the permanent connection to the node 100 of the next step in direction of the permanent connection. By these actions, it is possible to prevent the conversation of the other direction from being influenced, while invalidating only the PVC for executing the conversation of one direction.

The registration unit 12 registers that the concerned PVC is invalid, when it is judged by the monitoring unit 111 that the defect of the connection state occurs between the adjacent nodes 100, and when the invalidity of the PVC was notified from other adjacent node 100. The registration unit 12 owns a registration area (a disk, a file, a table, a database and so on) for executing the registration. In this case, it is desirable that the discrimination information of the every PVC which are set up so that the virtual path will pass through the concerned node 10 is listed in the registration area previously. By the construction, the registration of the invalidity of the PVC can be executed only by adding the information which indicates that it is valid (active) or invalid (inactive) to the discrimination information. The transfer of a frame can be rejected by a node 100, even if the frame by the concerned PVC was transmitted from the terminal to the node 100, when the invalidity of the PVC is registered in the above-mentioned way.

The notification unit 113 transfers an information of the invalidity of the PVC to the node 100 of the next step in the PVC.

No next node exists for a node 100, when the node 100 is connected to a terminal (or DTE). In this case, it is needless to say that the range of the present invention will not be deviated, even if the invalidity of the PVC is notified to the terminal(or DTE).

The notification unit 113 executes the notification of the invalidity of the PVC by a message notification frame.

According to the first embodiment, first of all, the monitoring unit 111 of all of the nodes 100 which compose the exchange network monitors the state of the connection between the node 100 itself and each adjacent node 100 which are connected mutually by the transmission path 101.

When it is detected by the monitoring unit 111 that the defect occurred in the connection state of the transmission path 101 between the node 100 and any other adjacent node 100, the registration unit 112 of the node 100 incorporating the monitoring unit 111 registers that the permanent connection which passes through the concerned transmission path 101 is invalid.

Then, the notification unit 113 of the node 100 notifies the invalidity of the concerned permanent connection to the node 100 of the next step in the invalid permanent connection.

The registration unit 112 of the node 100 of the next step which received the notification registers that the notified permanent connection is invalid.

Then, the notification unit 113 of the node 100 of the concerned next step notifies the invalidity of the concerned permanent connection to the node 100 of the further next step in the notified permanent connection.

By these actions, the invalidity of the concerned permanent connection is registered in all of the nodes 100 in which the permanent connection which is supposed to have a defect of the connection state on the virtual path is set up. Besides, the misuse of the permanent connection for which the invalidity is registered will be avoided in the future. On the other hand, it will be possible for a subscriber to take such actions as demanding a reconstruction of the permanent connection for the exchange network.

Second Embodiment

Figure 2:
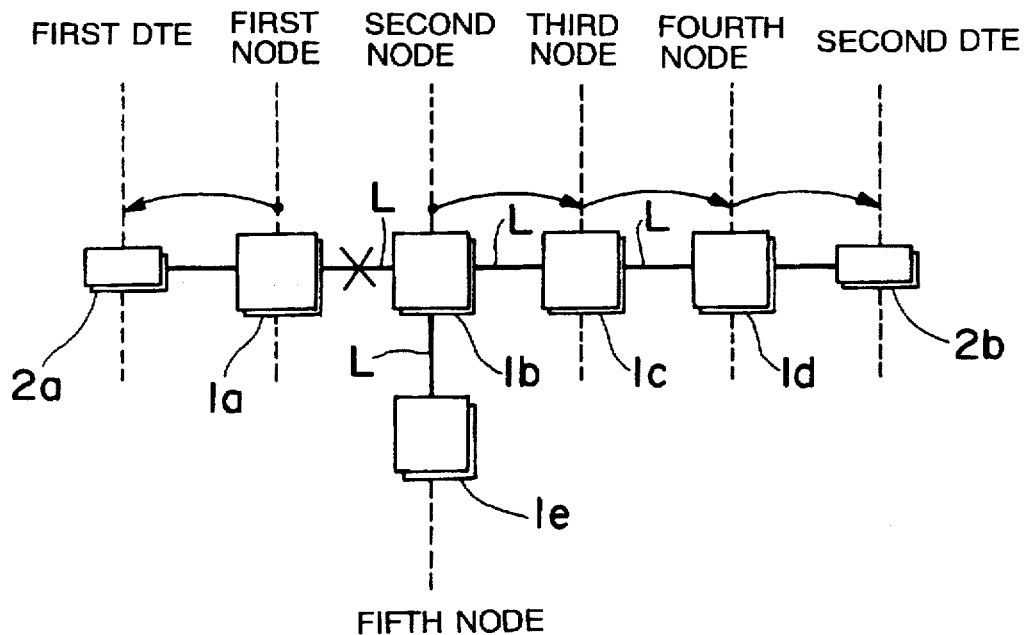
FIG. 2 is a diagram indicating an outline of an exchange network to which the second embodiment of the present invention is applied.

FIG. 2 indicates an outline of a frame relay exchange network to which the permanent connection management system according to the second embodiment of the present invention is adopted. In FIG. 2, the frame relay exchange network is indicated as comprising four nodes (a first node 1a, a second node 1b, a third node 1c and a fourth node 1d) which are connected mutually in series and one node (a fifth node 1e) diverged from the second node 1b for the convenience of the description (The nodes will be generally referred to as node 1 hereinafter).

Each of the nodes 1 is connected mutually by a transmission path L in which a plurality of PVCs can be set up. Further, a first data terminal equipment (DTE) 2a is connected to the first node 1a, and a second data terminal equipment (DTE) 2a is connected to the fourth node 1d.

Besides, in FIG. 2, the state that two PVCs ( a PVC of the direction in which the first terminal equipment 2a is regarded as a transmission source(namely, the up direction) and a PVC of the direction in which the second data terminal equipment 2b is regarded as a transmission source (namely, the down direction)) are set up is indicated. Besides, the state that the transmission path between the node 1a and the node 1b is disconnected (link inactive) in the direction from the first node 1a to the second node 1b is indicated.

A concrete construction of each node 1 is shown in FIG. 3. In FIG. 3, the switch unit (SW) 11 is connected to a plurality of channels (CH) 12, and is connected to the PVC management unit (MNG) 13. The PVC management unit 13 is connected to the database 14. Besides, the switch unit (SW) 11 and the PVC management unit 13 are connected to the operation system (OS) 10. The OS 10 is a system which embodied a function that is realized when a central control unit of the node 1 executes an operation system program. Besides, the PVC management unit 13 is a unit which embodied a function that is realized when the central control unit of the node 1 executes a control program. Each of the units will be described as follows.

Figure 4:
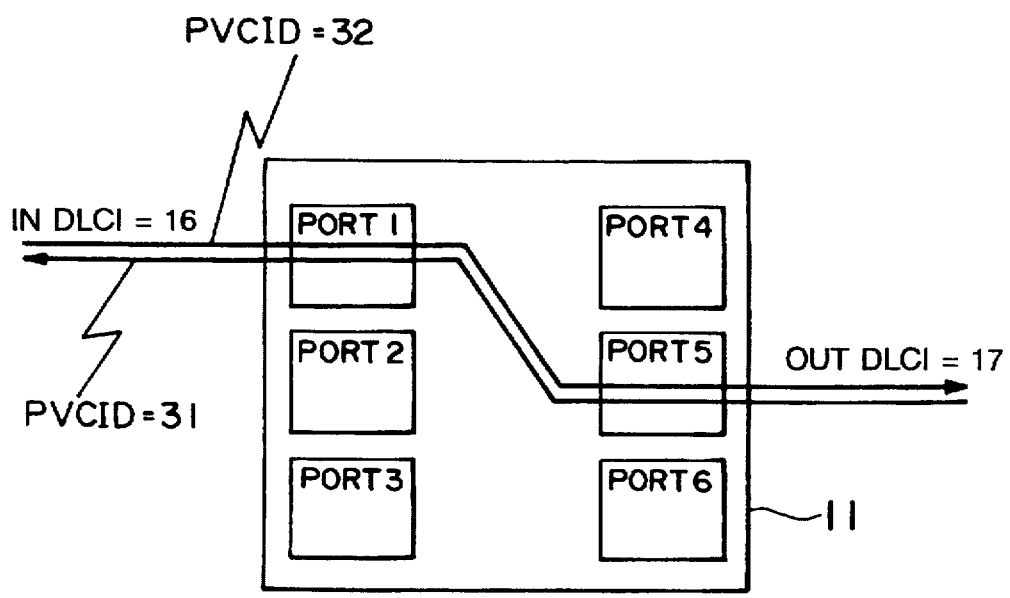
FIG. 4 is a block diagram indicating a construction of a switch unit in FIG. 3.

The switch unit (SW) 11 has a path switching function for transmitting the frame transmitted from the outside through one of the channels (CH) 12 to one of the channels 12 connected to the communication counterpart under the control of the PVC management unit (MNG) 13 and the operation system (OS) 10. As shown in FIG. 4, the switch unit (SW) 11 is provided with a large number of ports connected to one of the channels 12. FIG. 4 indicates that the PCV having a PVC ID=32 is set up in the direction from PORT 1 connected to the first channel to PORT 5 connected to the fifth channel, and the PVC having a PVC ID=31 is set up in the reverse direction. As mentioned hereinbefore, the serial PCV IDs are given to one pair of the up and down PVCs which are set up for the same communication. Namely, the even-numbered PVC IDs are given to the up PVCs, and the odd-numbered PVC IDs are given to the down PVCs.

Each channel 12 is an interface for connecting the ports to other node 1 or the terminal 2. Accordingly, all of the frames to be transmitted to one adjacent node 1 pass through the same channel 12. Similarly, all of the virtual paths which are set up extending over the adjacent nodes 1 are extended in the same channel 12.

The database 14 stores a PVC state management table 14a shown in FIG. 5 and a routing table 14b shown in FIG. 6 and FIG. 7.

The PVC state management table 14a is a table in which the discrimination number (PVC ID) and the state of the PVC ("active" or "inactive") are written as they correspond each other, in reference to all of the PVCs which pass through the concerned node 1. The "active" indicates that the corresponding PVC is valid and is in a state it can be used. Besides, the "inactive" indicates that the corresponding PVC is invalid and is in a state it can not be used. The value of the PVC state can be rewritten according to circumstances.

The routing table 14b is prepared for every port 12 in order to manage the PVC which enters the switch unit (SW) 11 through the port. FIG. 6 indicates the routing table 14b which was prepared for the first port as one example. Besides, FIG. 7 indicates the routing table 14b which was prepared for the fifth port. Each routing table 14b is a table in which an input side data link connection identifier (IN DLCI) added to the frame, a port number to which the frame is outputted (OUT PORT), an output side data link connection identifier (OUT DLCI) added to the frame when it is outputted and a discrimination number of the PVC (PVCID) are written as they correspond one another, in reference to all of the PVCs into which the frame is inputted through the corresponding port. Each of the information is written when the PVC is set up, and is rewritten when the setting of the PVC is changed. Further, as illustrated in the comparison between FIG. 6 and FIG. 7, the IN DLCI of the PVC of the up direction agrees with the OUT DLCI of the PVC of the down direction, and the IN DLCI of the PVC of the down direction agrees with the OUT DLCI of the PVC of the up direction.

The PVC management unit (MNG) 13 manages the PVC which is set up passing through the concerned node 1. Each port is provided with the PVC management unit 13 respectively. Accordingly, the PVC management units 13 of the same number as the number of the ports are provided. The PVC management unit 13 receives the frame from the switch unit 11, when the frame which belongs to a PVC was inputted from one port to the switch unit 11. Then, the PVC management unit 13 takes out the corresponding routing table 14b on the basis of the number of the port. Then, the PVC management unit 13 reads out the PVC ID on the basis of the DLCI stored in the header unit of the frame. After that, the PVC management unit 13 retrieves the PVC state management table 14a to acquire the information concerning the validity and the invalidity of the PVC indicated by the PVC ID. The PVC management unit 13 indicates that it will not execute the transfer of the frame to the switch unit 11, when the PVC is invalid. On the other hand, the PVC management unit 13 retrieves the routing table 14b for the second time to acquire the information concerning the number of the output side port (OUT PORT) to which the frame is transferred and the data link connection identifier (OUT DLC1) from the entry from which the PVC ID was read out, when the PVC is valid. The PVC management unit 13 rewrites the header unit of the frame on the basis of the OUT DLCI, and adds the number of the output side port to the frame and returns the frame to the switch unit 11. Further, the switch unit 11 to which the frame was returned transfers the frame to the corresponding port on the basis of the number of the output side port added to the frame.

Besides, the PVC management unit 13 monitors the connection state of the link (the interface and the transmission path L and so on) between the node 1 and the other node 1 which are connected adjacently through the channel 12. To put it concretely, the PVC management unit 13 monitors the connection state of the link in the direction from the other node 1 to the node 1 incorporating itself. Then, the PVC management unit 13 notifies the invalidity to the node of the next step in the PVC, in reference to all of the PVCs which pass through the link, when the defect occurred in the connection state of the link.

Figure 8:
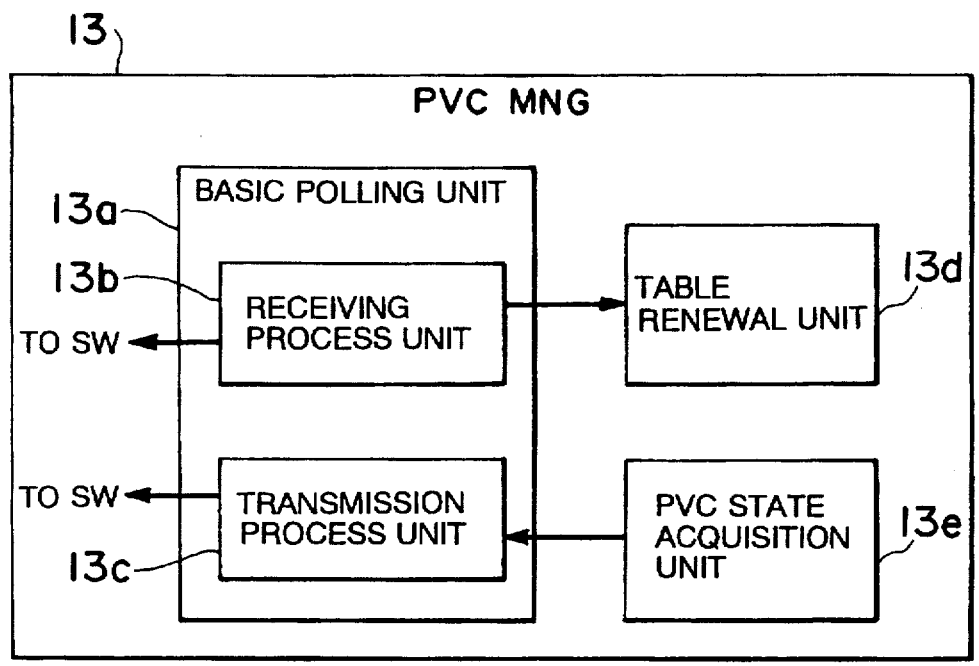
FIG. 8 is a block diagram indicating a construction of PVC management unit in FIG. 3.

The construction which the PVC management unit 13 owns for executing the function will be described on the basis of FIG. 8. As shown in FIG. 8, the PVC management unit 13 comprises a basic polling unit 13a, a table renewal unit 13d and a PVC state acquisition unit 13e. Further, the basic polling unit 13b is composed of a receiving process unit 13b and a transmission process unit 3c. Besides, each of the function units indicates an associating of the functions which are produced when the central control unit executes a control program.

The table renewal unit 13d renews the contents of the registration in the PVC state management table 14a and rewrites them into active or inactive, in reference to the PVC which received a demand for renewing the contents of the registration from the receiving process unit 13b.

The PVC state receiving unit 13e retrieves the PVC state management table 14a in reference to the PVC which received a demand from the transmission process unit 13c, and reads that the state of the PVC is active or inactive.

Figure 9:
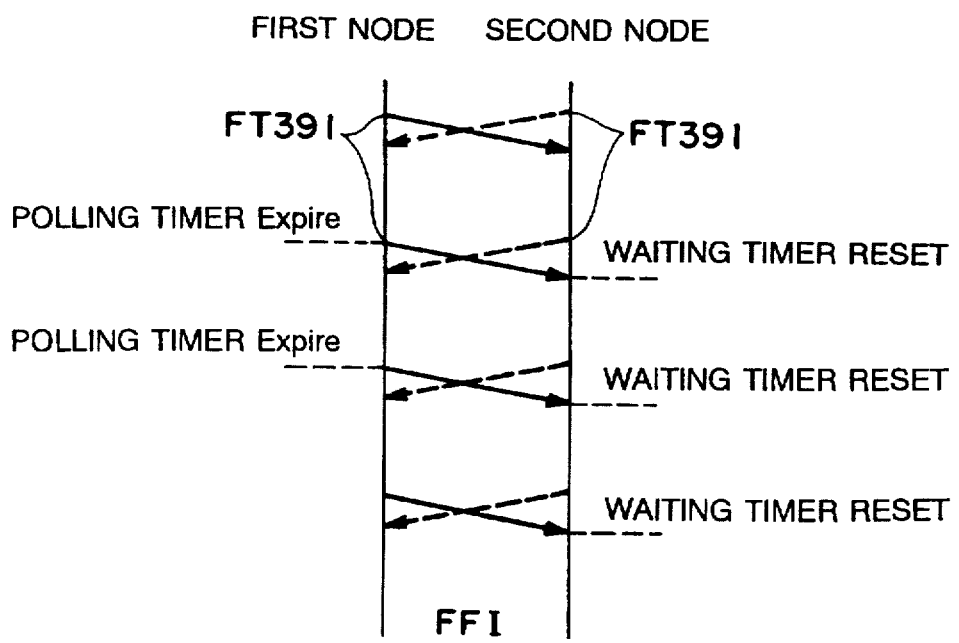
FIG. 9 is a diagram describing a periodic polling.
Figure 10:
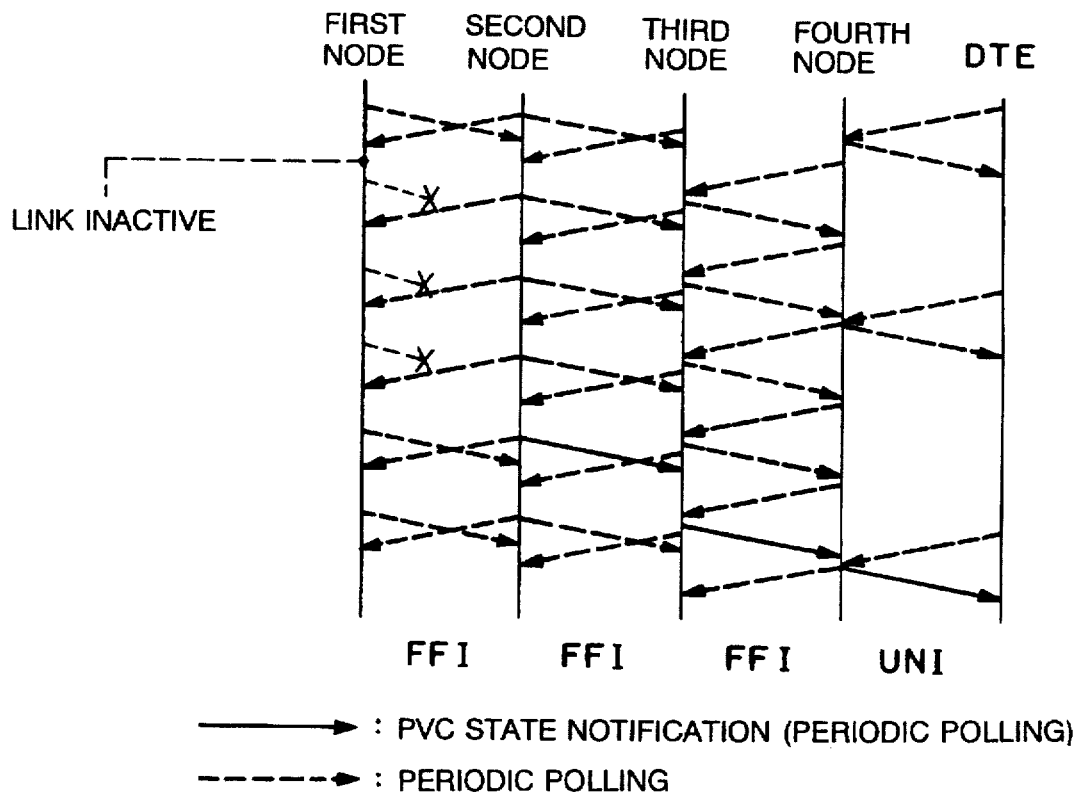
FIG. 10 is a diagram describing a state in which a PVC state information message is transmitted.

The basic polling unit 13a executes a basic polling shown in FIG. 9 and FIG. 10 with the receiving process unit 13b and the transmission process unit 13c. The receiving process unit 13b executes the above-mentioned renewal and sets a flag indicating reception of the PVC state notification in the output side port of the PVC, in reference to all of the PVCs which are set up passing through the channel in which the connection defect occurs, when the connection defect was detected through the basic polling. The transmission process unit 13c transmits a PVC state information written on the basic polling to the node 1 of the next step in the PVC which is inactive, and notifies that the PVC became invalid, when the flag is raised.

Hereupon, the procedures for the basic polling will be described on the basis of FIG. 9 and FIG. 10. FIG. 9 indicates the state before the connection defect occurred, and FIG. 10 indicates the state in which the connection defect occurred. As shown in FIG. 9, each node 1 executes a polling periodically for the adjacent nodes 1 which are connected mutually by the transmission path. The transmission process unit 13c receives a timer notification from the operation system (OS) 10 and starts the frame transmission timer which is a software timer, in order to execute the polling periodically. Then, the transmission process unit 13c transmits a frame (a link state monitoring frame) whenever the fixed time passes. On the other hand, the receiving process unit 13b receives a timer notification from the operation system (OS) 10 and starts the frame receiving timer which is a software timer, in order to set up a time limit for receiving the frame (the link state monitoring frame) from the adjacent node 1. The receiving process unit 13b recognizes that the polling has been executed when it receives the frame before the time limit set up by the frame receiving timer, and recognizes that the polling has not been executed when it does not receive the frame before the time limit.

Then, as the second node 1b shown in FIG. 10, the node 1 detects that the defect occurs in the connection through the link, when the defect of the polling occurs three times due to the disconnection of the link between the node 1a and the adjacent node 1a. In the FIG. 10, the polling is not lacking in the direction from the second node 1b to the first node 1a, so it is judged that the defect does not occur in the link of the direction.

When it is detected that the defect of the connection occurs, the receiving process unit 13b retrieves the routing table 14b, assigns the PVC whose virtual path is set up passing through the link (the transmission path L and the channel), and reads out the PVC ID and the out port number. Then, the receiving process unit 13b makes the table renewal unit 13d renew the contents of the registration on the PVC state management table 14a, in reference to the assigned all PVCs. Namely, the receiving process unit 13b rewrites the column of the "PVC state " on the PVC state management table 14a corresponding to the PVC ID which was read out into "inactive". Besides, the receiving process unit 13b sets the flag indicating reception of the PVC state notification in the PVC management unit 13 for the port corresponding to the port number which was read out. The flag is set in the memory area provided for each PVC management unit 13.

In the PVC management unit 13 in which the flag indicating reception of the PVC state notification is set, when the transmission process unit 13c detects the flag, it retrieves the routing table 14a to acquire the PVC ID of the all PVCs which is set up so that it will enter the switch unit 11 through the port corresponding to the PVC management unit 13. Then, the transmission unit 13c calculates the PVC ID of the PVC of the reverse direction corresponding to the acquired PVC ID. Namely, 1 is added to the PVC ID, when the acquired PVC ID is an odd number, and 1 is subtracted from the PVC ID, when the received PVC is a even number. Then, the transmission process unit 13c makes the PVC state acquisition unit 13e retrieve the PVC state management table 14a and acquires the PVC ID of the PVC whose PVC state was renewed from active to inactive among the calculated PVC IDs of the reverse direction. The transmission process unit 13c prepares a PVC state information on the basis of the acquired PVC ID, and writes the PVC state information on the link state monitoring frame to be sent to the next mode. The PVC state information is composed of the PVC ID and the information indicating that the state of the PVC corresponding to the PVC ID was changed.

Figure 11:
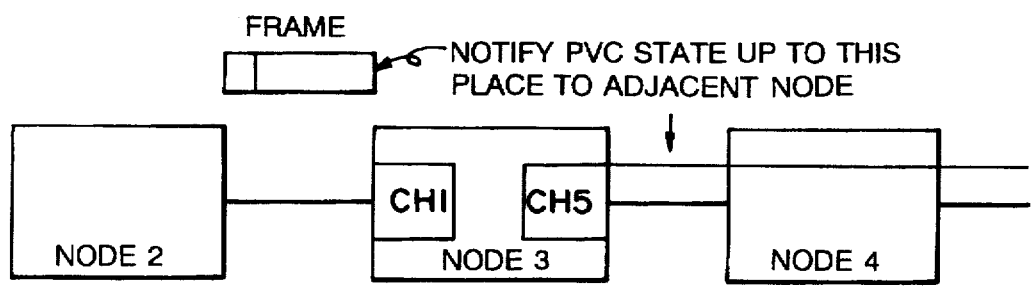
FIG. 11 is a diagram indicating a transferring of a PVC state information message.

When the receiving process unit 13b received the PVC state information frame from the adjacent node through the switch unit 11, it retrieves the routing table 14b on the basis of the PVC ID included in the PVC state information frame to read out the out port number of the PVC corresponding to the PVC ID. Then, the receiving process unit 13b makes the table renewal unit 13d renew the contents of the registration on the PVC state management table 14a. The table renewal unit 13d rewrites the column of the "PVC state" on the PVC state management table 14a corresponding to the PVC ID included in the PVC state information frame into "inactive". Besides, the receiving process unit 13b reads out the out port number of the assigned each PVC from the routing table 14b, and sets the flag (the flag indicating reception of the PVC state notification) in the PVC management unit 13 for the port corresponding to the out port number. In the PVC management unit 13 in which the flag indicating reception of the PVC state notification is set, the transmission process unit 13c transfers the PVC state information to the further next node. Accordingly, as shown in FIG. 10 and FIG. 11, the PVC state information generated in the second node 1b are transferred to the nodes 1 (the third node 1c and the fourth node 1d) in which the concerned PVC is extended one after another, and is received by the second terminal (DTE) lastly. The second terminal (DTE) 2b transmits a message indicating that the concerned PVC became invalid to the first terminal (DTE) 2a through the PVC of the reverse direction, after receiving the PVC state information. By these actions, the first terminal(DTE) 2a can recognize that the PVC became invalid, too.

Then, the process which is executed for realizing the function of the above-mentioned basic polling unit 13a will be described by referring to FIG. 12 and FIG. 13.

First of all, the process of FIG. 12 which is processed in the receiving process unit 13b will be described. The process of FIG. 12 is executed per port (each PVC management unit 13) in parallel, in the case that the switch unit 11 of the concerned node 1 has a plurality of ports, namely, in the case that a plurality of PVC management units 13 exist.

Figure 12:
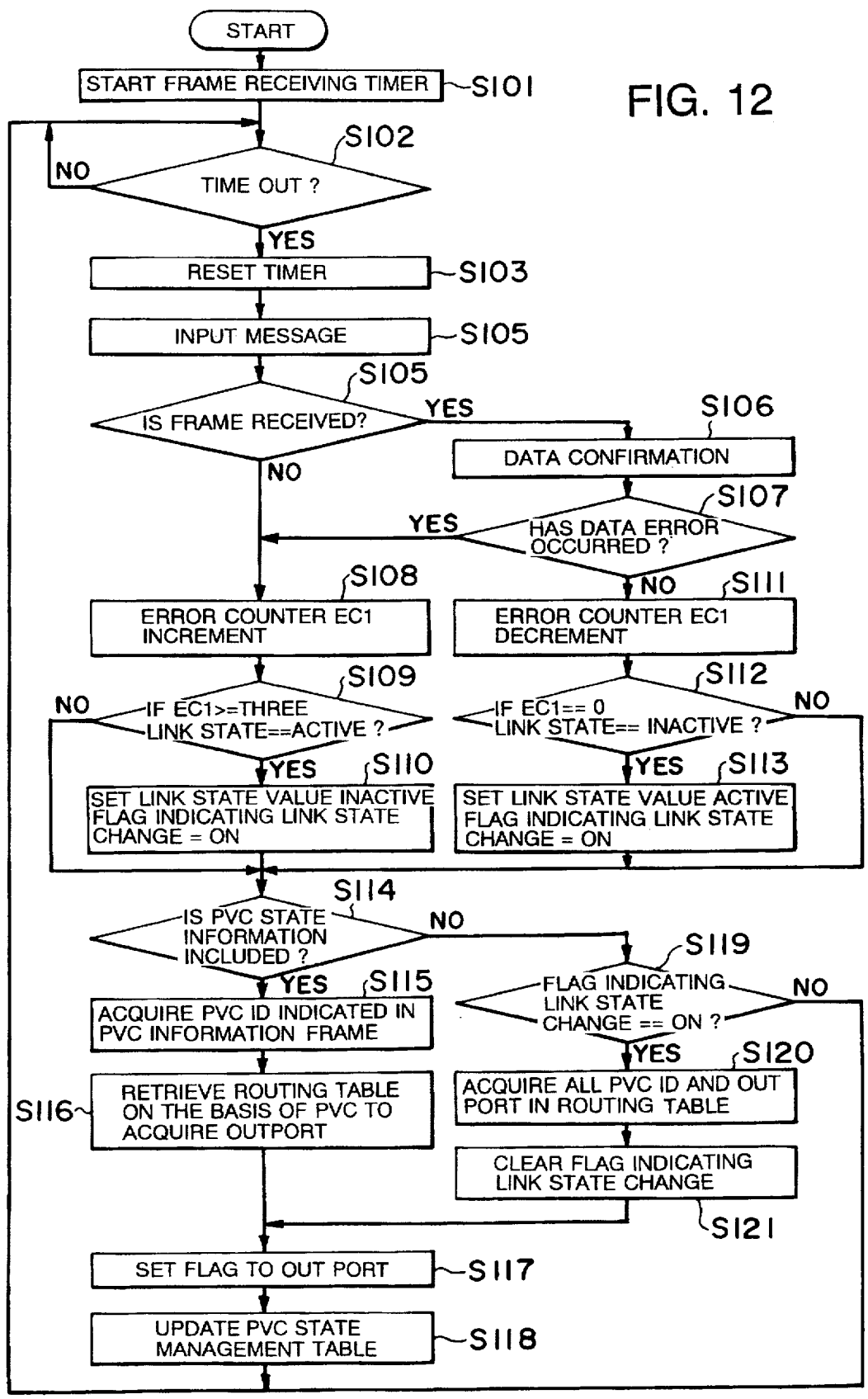
FIG. 12 is a flowchart indicating a process executed in a receiving process unit in FIG. 8.

The process of the FIG. 12 is started with the node 1 switched on. Then, the frame receiving timer is started in Step S 101. The frame receiving timer is a timer for measuring whether the elapsed time after the start has reached reference time or not.

Then, a watch-and-wait is executed until the elapsed time of the frame receiving timer reaches the reference time in Step S 102. When the elapsed time of the frame receiving timer reaches the reference time, the frame receiving time is reset in Step S 103 and the messages (a link state monitoring frame) which are received during that elapsed time is inputted in Step S 104. If no messages are received, the process will be continued as it is.

Then, in Step S 105, it is checked whether or not a link state monitoring frame is included in the message inputted in Step S 104, namely, whether or not the frame was received. If the frame was not received, the process proceeds to Step S 108. If the frame was received, the process proceeds to Step S 106. In Step 106, a data is confirmed. In the next Step 107, it is checked whether the data was an error or not. If it was an error, the process proceeds to Step S 108, and if it was not an error, the process proceeds to Step S 111.

In Step S 108, an error counter (EC1) is incremented. The error counter is a counter for measuring the number of times that the link state monitoring frame was not received. In the next Step S 109, it is checked whether or not the value of the error counter (EC1) is equal to or more than three, and the link state value of the concerned port is set "ACTIVE". The link state value is a value set in a memory area provided for the concerned port. When the value of the error counter (EC1) is equal to or more than three, and the link state of the concerned port is set "ACTIVE", the link state of the concerned port should be set "ACTIVE", and the flag indicating PCV state change should be set ON in Step S 110. The process proceeds to Step S 114 after Step S 110 is executed. On the other hand, in Step 109, when the value of the error counter (EC1) was less than three, or when the link state of the concerned port is set "INACTIVE", the process proceeds to Step S 114 directly.

On the other hand, in Step S 111, the error counter (EC1) is decremented. In the next step S 112, it is checked whether or not the value of the error counter (EC1) is 0, and the link state value of the concerned port is set "INACTIVE". When the value of the error counter (EC1) is 0, and the link state value of the concerned port is set "INACTIVE", the link state of the concerned port should be set "ACTIVE", and the flag indicating the PVC state change should be set ON in Step S 113. The process proceeds to Step S 114 after Step S 113 is executed. On the other hand, in Step S 112, when the value of the error counter (EC1) is equal to or more than 1, or when the link state of the concerned port is set "ACTIVE", the process proceeds to Step S 114 directly.

In Step S 114, it is checked whether or not the PVC state information is included in the message inputted in Step S 104, namely, whether or not the link state monitoring frame including the PVC state information was received. If the PVC state information was included, the PVC ID contained in the PVC state information frame is read out in Step S 115. Then, in the next Step S 116, the routing table 14b for the port managed by the concerned PVC management unit is retrieved on the basis of the PVC ID, and the out port number corresponding to the PVC ID is read out. The process proceeds to Step S 117 after that.

On the other hand, when the PVC state information was not included in Step S 114, it is checked whether or not the flag indicating link state change is set ON in Step S 119. When the flag indicating link state change is not set ON, the process returns to Step S 102 as it is. On the other hand, when the flag indicating link state change is set ON, the routing table 14b for the port managed by the concerned PVC management unit 13 is retrieved and the all PVC IDs and the out port number corresponding to the PVC ID listed in the routing table 14b are read out in Step S 120. After that, in Step S 121, the flag indicating link state change is cleared, and the process proceeds to Step S 117.

In Step S 117, the flag indicating reception of the PVC state notification is set for all of the other PVC management units 13 which manage the ports corresponding to the each out port number that was read out in Step S 116 or Step S 120. In the next step S 118, the update of the PVC management table 14a is executed. Namely, the state of the PVC in the entry corresponding to the each PVC ID read out in Step S 116 or Step S 120 should be rewritten on the basis of the link state value of the concerned port and the PVC state information. To put it concretely, when one of the link state values and the PVC state information is "INACTIVE", the PVC state of the concerned entry of the PVC management table 14a should be overwritten "INACTIVE", and the PVC state of the concerned entry should be overwritten "ACTIVE" in other cases. Then, the process returns to Step S 102 after that.

Then, the process of FIG. 13 which is processed in the transmission process unit 13c will be described. The process of FIG. 13 is executed per port (each PVC management unit 13) in parallel, in the case that the switch unit 11 of the concerned node 1 has a plurality of ports, namely, in the case that a plurality of PVC management units 13 exist.

Figure 13:
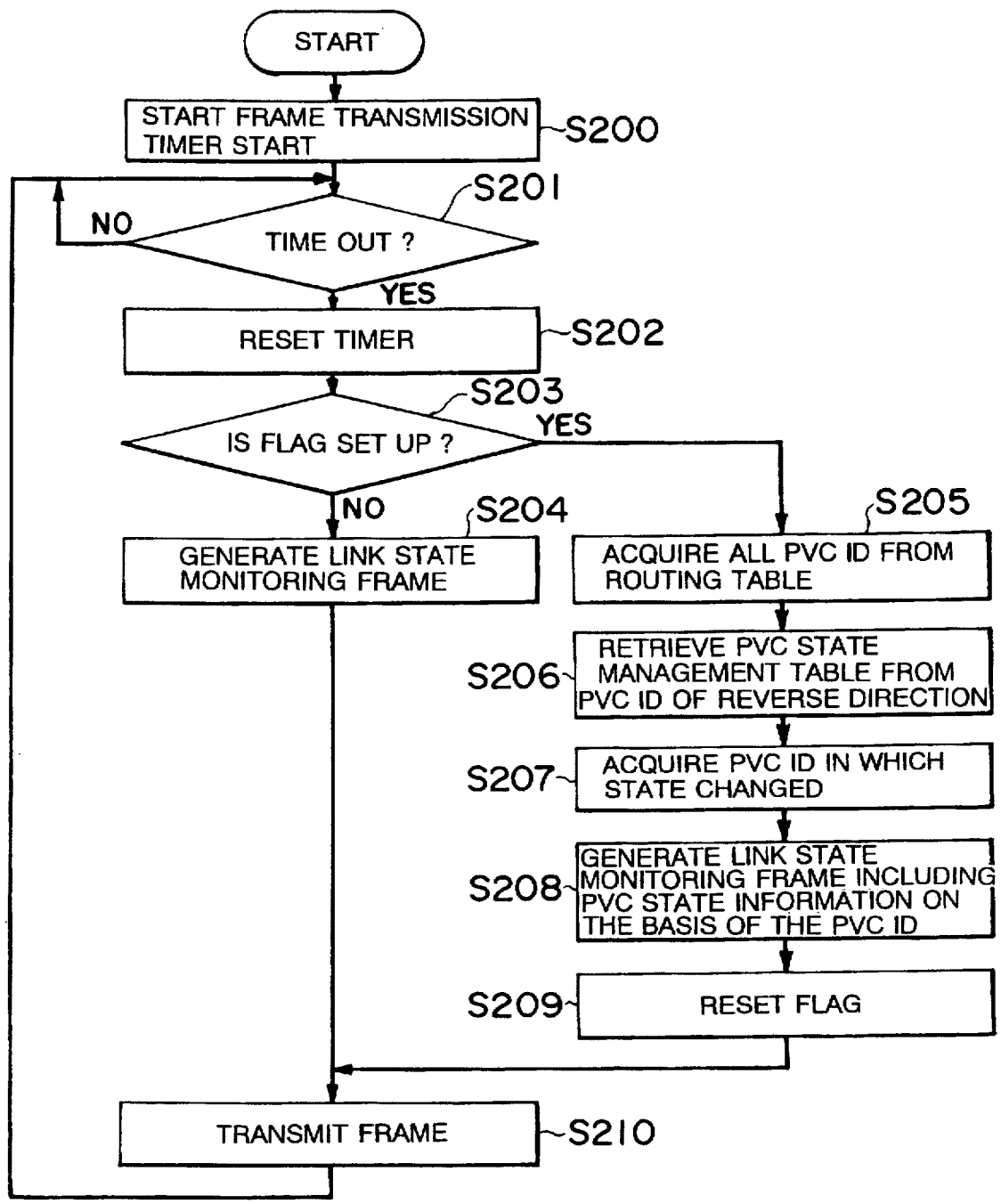
FIG. 13 is a flowchart indicating a process executed in a transmission process unit in FIG. 8.
Figure 14:
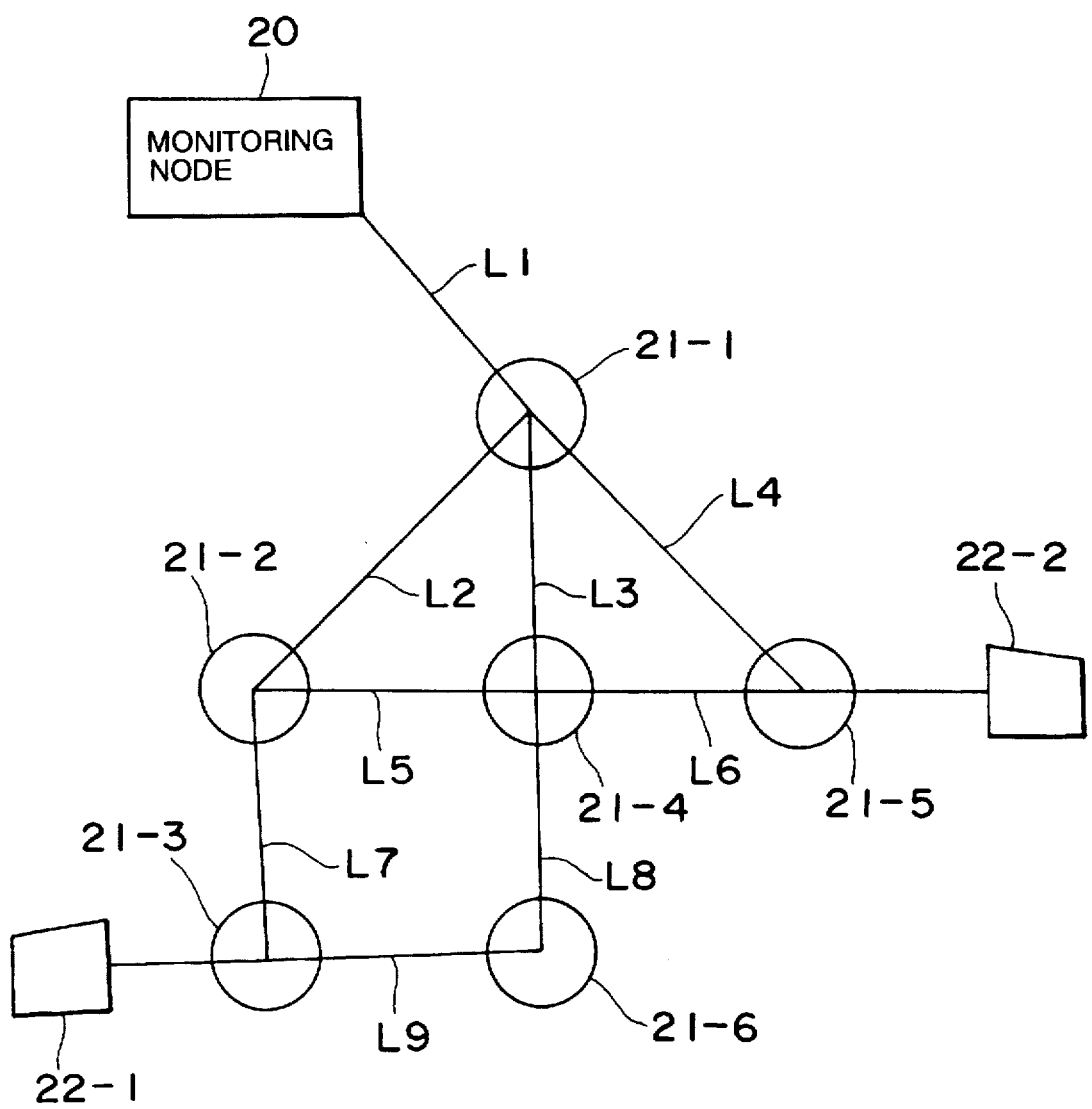
FIG. 14 is a diagram indicating a conventional example.

The process of the FIG. 13 is started with the node 1 switched on. Then, the frame transmission timer is started in Step S 200. The frame transmission timer is a timer for measuring whether the elapsed time after the start has reached reference time or not.

Then, in Step S 201, a watch-and-wait is executed until the elapsed time of the frame transmission timer reaches the reference time. When the frame transmission timer has reached the reference time, the frame transmission timer is reset in Step S 202, and it is checked whether or not the flag indicating reception of the PVC state notification is set in Step S 203. If the flag is not set, the link state monitoring frame is generated in Step S 204, the frame is transmitted in Step 210 and the process returns to Step S 201 for the polling of the next time.

On the other hand, if it is determined in Step S 203 that the flag indicating reception of the PVC state notification is set, the routing table 14a for the ports managed by the concerned PVC management unit 13 is retrieved, and all of the PVC IDs inserted in the routing table 14a are read out in the Step S 205. In the next Step S 206, the PVC ID of the PVC of the reverse direction coupled with the PVC indicated by the read PVC ID is calculated (The method for calculating PVC ID has been already described.) and the PVC state management table 14a is retrieved on the basis of the calculated PVC ID. Then, in the next Step S 207, the PVC ID in which the contents of the column of the PVC state corresponding to the entry were changed is assigned among the PVC IDs which were calculated in Step S 206. By the way, the flag indicating reception of the PVC state notification does not indicate which PVS state of the PVC ID was changed nor how the PVC state of the PVC ID was changed. However, the transmission process unit 13c can compare the state of the PVC state management table 14a retrieved in this time with the state of the PVC state management table 14a retrieved in the last time and held so that it assign the changed PVC ID.

In the next step S 208, a link state monitoring frame including the PVC state information is generated on the basis of the PVC ID assigned in Step S 207. In the next Step 209, the flag indicating reception of the PVC state notification of the concerned PVC management unit 13 is reset. Then, in Step S 210, the link state monitoring frame generated in Step S 208 is transmitted toward the adjacent node. The process returns to Step S 201 after that.

According to the second embodiment described hereinbefore, the monitoring frame possessory rate on the link which is supposed to occur in the intensive monitoring system can be reduced, since the state information of the PVC can be transmitted by exchanging the message with the adjacent node 1.

Besides, it can be said that even the same PVC varies in the connection states depending on the direction, when the construction of the switch unit 11 in each node 1 is considered. However, in the second embodiment, the change of the state of the PVC due to the connection defect in one direction can be prevented from influencing the PVC state of the reverse direction, since the management is executed by adding a different PVC ID which is in accordance with the direction of the communication to the same PVC. For instance, if it is supposed that the link in the direction for the second node 1b is disconnected between the first node 1a and the second node 1b in FIG. 2, the user frame which is being transmitted in the direction of the first data terminal equipment 2a and staying within the exchange network must reach the first data terminal equipment 2a, even though the user frame will be prohibited from transferring in the direction for the second data terminal equipment 2b. In the second embodiment, the state change of one direction can be prevented from influencing the PVC state of the reverse direction by means of managing the PVC state depending on the directions.

Besides, the data terminal equipment 2 can grasp the state of the link at a real time, since the node 1 which received a PVC state information from other node 1 can transmit the PVC state information to the node 1 of the PVC travelling direction without delay.

Further, each node can be informed that the PVC became valid, since the polling is resumed as soon as the disconnection of the like is restored.

According to the present invention, the special monitoring node is needless, and the defect of the connection state of the PVC can be transmitted to all of the nodes on the concerned PVC without giving the excessive load to the transmission path.

The present invention being thus described, it will be obvious that same way be varied in same way. Such variations are not be regarded as a departure from the spirit and the scope of the invention, and all such modification as would be obvious one skilled in the art intended to be included within the scope of the following claims.

What is claimed is:

1. A permanent connection management method in an exchange network which is composed of a plurality of nodes connected mutually by a transmission path, the method comprising:

monitoring by both adjacent nodes a connection state of the transmission path between said nodes;

registering in said monitoring node that the permanent connection which is set up so as to pass through the transmission path is an invalid permanent connection, when a defect of a connection state is detected;

notifying the invalidity of the permanent connection to only the node of the next step in the invalid permanent connection by said monitoring node;

registering in the notified node that the notified permanent connection is invalid; and notifying by said notified node the invalidity of the notified permanent connection to the node of the further next step in the invalid permanent connection, wherein each of nodes in the invalid permanent connection notifies the invalidity of the permanent connection to the node of the next step in the invalid permanent connection by acquiring all permanent virtual circuit identification numbers from a routing table, retrieving a PVC state management table based on permanent virtual circuit identification numbers of permanent virtual circuits of a reverse direction coupled with permanent virtual circuits of the acquired permanent virtual circuit identification numbers, acquiring a permanent virtual circuit identification number changed by using the PVC state management table and generating a link state monitoring frame including the PVC state information.

2. A permanent connection management method in exchange network according to claim 1, wherein the adjacent both nodes execute a periodic polling mutually, and each of the nodes detects a defect of the connection state between them when a lack of the polling from the other nodes is detected.

3. A permanent connection management method in exchange network according to claim 1, wherein each of the nodes monitors all permanent connections whose virtual paths are set up so as to pass through the node for every communication directions by the connection, registers, when the defect of the connection state is detected, that the concerned connection is invalid only in reference to the permanent connection whose direction is the same as the connection in which the defect occurred, and notifies the invalidity of the permanent connection to only the node of the next step in the invalid permanent connection.

4. A node which composes an exchange network when it is connected to another node by a transmission path, comprising:

a data registration unit for registering a connection state of a permanent connection which is set up between the node and an adjacent other node;

a trouble monitoring unit for detecting a defect of the transmission path through which said permanent connection is set up;

a data renewal unit for making said data registration unit register that the permanent connection which is set up so as to pass through the transmission path is an invalid permanent connection, when the defect of the transmission path is detected by said trouble monitoring unit; and notification means for notifying that the permanent connection is invalid only to the node of the next step in the invalid permanent connection, when the defect of the transmission path is detected by said trouble monitoring unit;

wherein the node notifies the invalidity of the permanent connection to the node of the next step in the invalid permanent connection by acquiring all permanent virtual circuit identification numbers from a routing table, retrieving the PVC state management table based on permanent virtual circuit identification numbers of permanent virtual circuits of a reverse direction coupled with permanent virtual circuits of the acquired permanent virtual circuit identification numbers, acquiring a permanent virtual circuit identification number changed by using the PVC state management table and generating a link state monitoring frame including the PVC state information.

5. A node according to claim 4, wherein said trouble monitoring unit executes an information exchange with the adjacent other node, and detects a defect of the transmission path, when the information is not transmitted from the adjacent other node.

6. A node according to claim 5, wherein said trouble monitoring unit executes a polling per fixed time with the adjacent other node, and detects a defect of the transmission path, when the polling from the adjacent other node could not be detected within a preset time.

7. A permanent virtual connection management method in an exchange network which is composed of a plurality of nodes connected by a transmission path, the process comprising:

registering a valid state in relation to each permanent virtual connection which is set up passing through the transmission path;

detecting a defect in the transmission path between said nodes;

assigning a permanent virtual connection which is set up so as to pass through the transmission path having the defect which was detected;

registering in a node detecting the defect, an invalid state in relation to the assigned permanent virtual connection; and notifying the invalidity of the assigned permanent virtual connection to the next step node which is connected to the assigned permanent virtual connection, wherein each of nodes in the invalid permanent connection notifies the invalidity of the permanent connection to the node of the next step in the invalid permanent connection by acquiring all permanent virtual circuit identification numbers from a routing table, retrieving a PVC state management table based on permanent virtual circuit identification numbers of permanent virtual circuits of a reverse direction coupled with permanent virtual circuits of the acquired permanent virtual circuit identification numbers, acquiring a permanent virtual circuit identification number changed by using the PVC state management table and generating a link state monitoring frame including the PVC state information.

8. A permanent virtual connection management method in an exchange network according to claim 7, further comprising:

registering in the notified node, an invalid state in relation to the assigned permanent virtual connection; and notifying by said notified node, the invalidity of the assigned permanent virtual connection to the node of the next further step which is connected to the assigned permanent virtual connection.

9. A node which composes an exchange network when it is connected to another node by a transmission path, comprising:

- a data registration unit for registering a valid state in relation to each permanent virtual connection which is set up passing through the transmission path;
- a trouble monitoring unit for detecting a defect in the transmission path;
- a virtual connection assigning unit for assigning a permanent virtual connection which is set up passing through the transmission path having the defect which was detected,
- a data renewal unit for making said data registration unit register that the assigned permanent virtual connection is an invalid state; and
- a notification unit for notifying the invalidity of the permanent virtual connection to the next step node which is connected to the permanent virtual connection;
- wherein the node notifies the invalidity of the permanent connection to the node of the next step in the invalid permanent connection by acquiring all permanent virtual circuit identification numbers from a routing table, retrieving the PVC state management table based on permanent virtual circuit identification numbers of permanent virtual circuits of a reverse direction coupled with permanent virtual circuits of the acquired permanent virtual circuit identification numbers, acquiring a permanent virtual circuit identification number changed by using the PVC state management table and generating a link state monitoring frame including the PVC state information.

10. A node which composes an exchange network where it is connected to another node by a transmission path, comprising:

- a trouble monitoring unit for detecting a defect in the transmission path;
- a virtual connection assigning unit for assigning a permanent virtual connection which is set up between terminals, passing through the transmission path having the defect which was detected; and
- a notification unit for notifying the invalidity of the permanent virtual connection to one of the terminals;
- wherein the node notifies the invalidity of the permanent connection to the node of the next step in the invalid permanent connection by acquiring all permanent virtual circuit identification numbers from a routing table, retrieving the PVC state management table based on permanent virtual circuit identification numbers of permanent virtual circuits of a reverse direction coupled with permanent virtual circuits of the acquired permanent virtual circuit identification numbers, acquiring a permanent virtual circuit identification number changed by using the PVC state management table and generating a link state monitoring frame including the PVC state information.

* * * * *